Oct. 29, 1963  R. L. MacDONALD, JR  3,108,825
NONINTERCHANGEABLE LIQUID OXYGEN AND LIQUID
NITROGEN COUPLING ASSEMBLY
Filed Feb. 24, 1960  3 Sheets-Sheet 1

OXYGEN

NITROGEN

INVENTOR.
RAYMOND L. MAC DONALD, JR.
BY
ATTORNEYS

Oct. 29, 1963 R. L. MacDONALD, JR 3,108,825
NONINTERCHANGEABLE LIQUID OXYGEN AND LIQUID
NITROGEN COUPLING ASSEMBLY
Filed Feb. 24, 1960 3 Sheets-Sheet 2
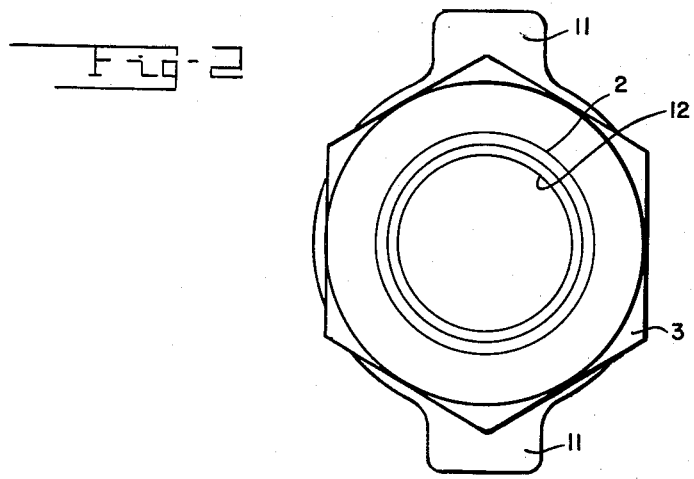
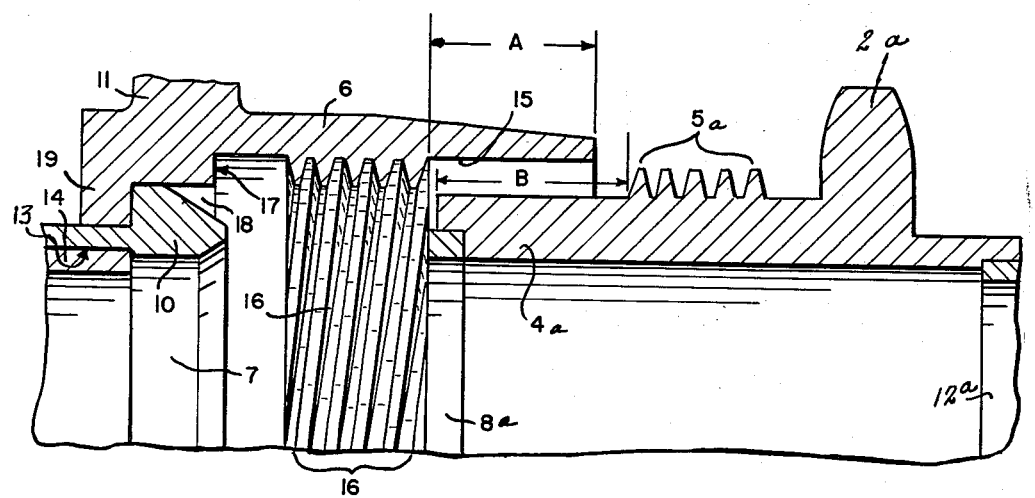
INVENTOR.
RAYMOND L. MAC DONALD, JR.
BY
ATTORNEYS

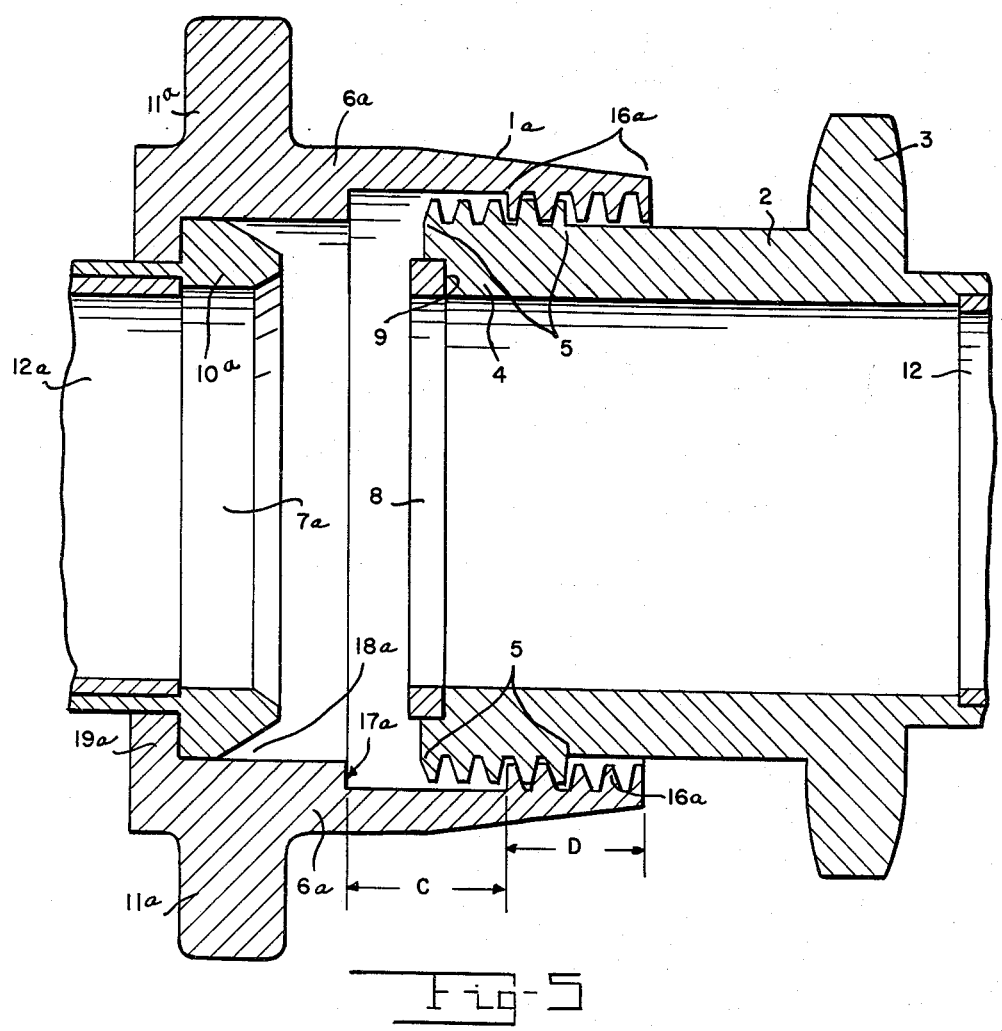

United States Patent Office 3,108,825
Patented Oct. 29, 1963

3,108,825
NONINTERCHANGEABLE LIQUID OXYGEN AND LIQUID NITROGEN COUPLING ASSEMBLY
Raymond L. MacDonald, Jr., 2005 W. Norbery St., Lancaster, Calif.
Filed Feb. 24, 1960, Ser. No. 10,814
2 Claims. (Cl. 285—18)
(Granted under Title 35, U.S. Code (1952), sec. 266)

The invention described herein may be manufactured and used by or for the United States Government for governmental purposes without payment to me of any royalty thereon.

This invention relates to the provision of a coupling assembly to connect transfer hose members between transport equipment and a storage facility and is designed more specifically for services with liquid oxygen and/or liquid nitrogen, and has for an object the incorporation of a "four start" fast thread requiring only one full turn to insure a leak tight connection of the coupling assemblies, employing a nonmetallic seal of compatible material, thereby eliminating a metal to metal seal and the application of hammering to insure a positive seal when the couplings are assembled.

A further object is the provision of a dual coupling device, utilizing a thread as a means of mating the coupling assembly to insure a positive connection when the couplings are tightened, and prevents the possibility of inadvertent separation or inadvertent wrong connections between the oxygen and nitrogen storage facilities.

A still further object is a change in the location of the threads on the mating parts of the coupling assemblies for differentiating the liquid oxygen coupling from the liquid nitrogen coupling and eliminating any possibility of intermixing these parts during transfer of the liquid oxygen and/or the liquid nitrogen between the liquid oxygen and nitrogen storage facility and/or the liquid oxygen and liquid nitrogen transport equipment.

Another object is the provision of two substantially similar pipe and/or hose coupling member having interengaging means thereon for positively preventing fluid transfer or tightening of the coupling when the respective coupling members of each are mixed or interchanged.

Other objects and advantages will be apparent from the following description and accompanying drawings in which like reference characters refer to like parts in the several figures.

FIGURE 2 is an end view of the coupling shown in FIGURE 1;

FIGURE 4 is a longitudinal half sectional view illustrating an attempt to couple one of the coupling parts of one of the pairs of the couplings to the other of the coupling parts of the other pair, for instance, the female coupling part of the oxygen coupling to the male part of the nitrogen coupling; and FIGURE 5 is a longitudinal sectional view, similar to FIGURE 4, but illustrating the relation of the parts when the other two parts of the pair of couplings are attempted to be coupled together, for instance, the female coupling part of the nitrogen coupling to the male part of the oxygen coupling part.

Figure 1:
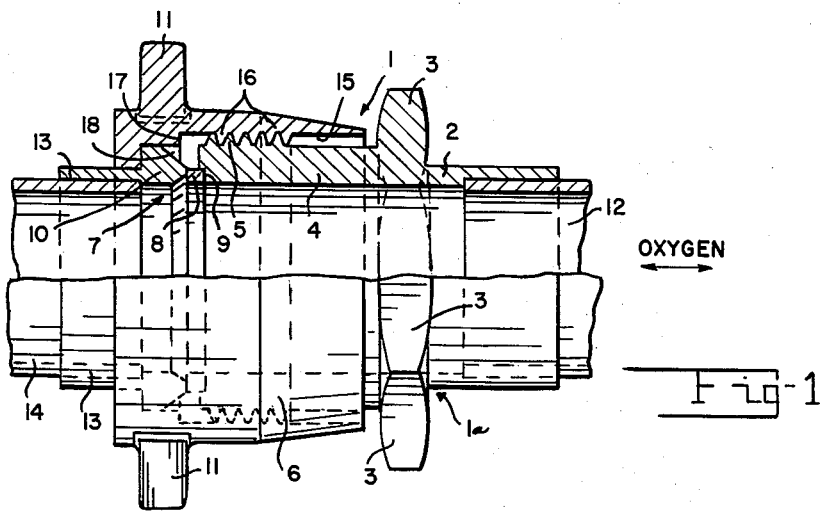
FIGURE 1 is a partial side and partial longitudinal sectional view of one of a pair of noninterchangeable fluid delivery couplings, for instance, a coupling for the delivery of liquid oxygen between a transport equipment and a storage facility.
Figure 3:
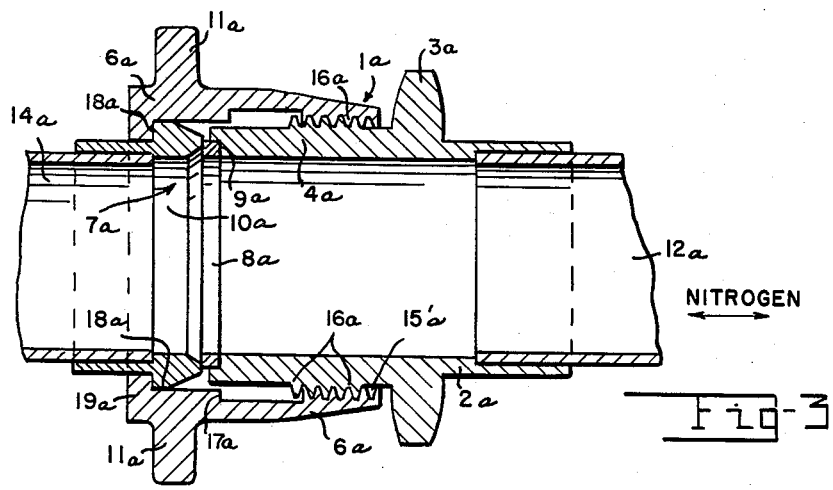
FIGURE 3 is a longitudinal sectional view of the other one of the aforesaid pair of noninterchangeable fluid delivery couplings, for instance, a coupling for the delivery of liquid nitrogen between the transport equipment and the storage facility.

In the drawings the reference numeral 1 denotes a first two-part threaded coupling of a pair of noninterchangeable couplings for the delivery of oxygen and nitrogen between a transport equipment and a storage facility, this coupling being shown in FIGURE 1 for fluid delivery, for instance, oxygen, while the reference numeral 1ª illustrates the second coupling of the pair, for delivery of a second different fluid, for instance, nitrogen between the transport equipment and the storage facility, this second coupling being shown in FIGURE 3.

The preferable method of installing this coupling assembly is to install the male halves of the couplings on the storage facility and install the ring nut and ferrule or female halves to each end of a flexible metal servicing hose, thus making it possible to service liquid to storage tanks from transport equipment or vice versa, the novel features being the thread positioning on the connectors and ring nuts and the associated complemental "four start" fast threads.

In the coupling shown in FIGURE 1 the male coupling member or connector 2 is provided with a hex flange 3 and an extension or neck 4 having its outer end portion threaded at 5 with four fast start threads requiring only one turn of the ring nut or female coupling 6 to advance the nose of the ferrule 7 into sealing contact with the annular sealing ring 8 which is seated in an annular seat in the outer end or face of the male connector 2 and located in the annular recess 9. The ferrule 7 has a head 10 on which the ring nut 6 is rotatably swivelled, the ring nut having driving lugs 11 on its opposite sides for tightening the coupling 1.

A fluid supply and delivery conduit 12 is suitably secured in the outer end of coupling 2 and leads to or from a storage facility for one type of liquid, for instance, liquid oxygen. The ferrule 7 is counterbored at 13 and has suitably fixed and seated therein a supply or delivery conduit 14 which is preferably a flexible pipe or hose and is connected or connectable to a transportation facility for the particular fluid, for instance, liquid oxygen.

The ring ferrule or coupling sleeve 6, as seen in FIGURE 1, is provided with an internal smooth bore 15, and four "fast start" single turn threads are provided, spaced inwardly, as indicated at 16, from a shoulder 17 adjacent the bore 18 for the head 10 of the ferrule 7.

Since the other or second coupling 1ª for the "other" fluid, such as nitrogen is quite similar, certain of these parts and elements which are similar to those in FIGURE 1 will be given the same reference characters but further identified by exponents added to the identification numerals.

The second coupling of the pair of noninterchangeable couplings, as previously noted, is indicated by the reference numeral 1ª and shown more particularly in FIGURE 3 comprises a male coupling member 2ª having a female coupling member or ring nut 6ª. The male coupling 2ª is provided with a sleevelike extension or neck 4ª having a fast start four-thread single turn thread portion 5ª but is located at a different longitudinal position in the neck 4ª from the location of the fast start threads 5 on the neck 4 of the coupling 1, namely closer to the hex or wrench receiving portion 3ª than the outer end portion for a distance from its outer extremity to the threads 5ª, being substantially equal or slightly greater than the length of the smooth portion 15 in the female coupling or ring nut 6, the other end of the member 2 being counterbored to provide a shoulder and receive the fluid supply and delivery pipe 12ª for the "other" fluid, such as nitrogen.

The exterior of the ring nut 6ª is identical to the ring nut 6 and is formed with the tubular body having diametrically opposite driving lugs 11ª for tightening (and loosening) the fitting, and its inner bore is provided with an annular flange 19ª and recess 18ª for the head 10ª of the pipe or hose receiving ferrule 7ª counter bored to receive the fluid supply and/or delivery pipe or conduit 14ª the nose of the head 10ª is disposed to engage the annular gasket or sealing ring 8ª which is seated in recess or channel 9ª in the outer end of the male coupling member neck 4ª.

The ring nut member 6ª is provided with a fast start four-thread single turn threaded portion 16ª in its bore which is in a different longitudinal location from the threaded portion 16 in the other ring nut or female coupling member 6, namely the threads 16ª in the ring nut member 6 start inwardly in spaced relation to the outer receiving end of the ring nut 6, being spaced from the outer end a distance A' which is about the same distance as the distance B from the outer end of the neck 4ª to the fast start threads 5ª on the neck 4ª of the male nitrogen coupling 1ª. It will be seen from FIGURE 4 that when an attempt to secure the female coupling part 6 to the male coupling 2ª that the annular sealing ring 8ª will engage the nose of the ferrule 7 before or substantially so before the threads 5ª can engage the threads 16 of the oxygen female coupling ring nut 6 and the couplings therefor can not be connected and tightened when intermixed.

With reference to FIGURE 5 when the nitrogen or second female ring nut 6ª is brought into engagement with the oxygen male coupling 2 the outer end of fast start threads 5 will engage the annular shoulder 17ª before the gasket 8 can engage the nose of the ferrule 7. If the distance C between the shoulder 17ª and the inner end of the fast start threads 15ª is made the same or substantially the same as the distance or length of the fast start threads 5 extending inwardly from the outer end of the neck 4 there is no possibility of the gasket 8 being brought into engagement with the nose or head of the ferrule 7ª and the nitrogen or second female fitting or ring nut 6ª can not be connected or tightened on the male or oxygen first fitting 2, thus making the other pair of the fittings noninterchangeable. If the length of the space C is made in excess of the width or axial length D of the fast start threads 16 the ring nut 6ª will turn "free" on the fitting 2 and can not be tightened.

The threads as shown in the drawing are all 4.5-4 start 1⅝" lead thread −29 deg. 2½ Acme Pitch R.H. thread.

While I have shown and described a preferred embodiment of my invention, it will be apparent that variations and modifications thereof may be made without departing from the underlying principles of the invention. I therefore desire, by the following claims to include within the scope of the invention all such variations and modifications by which substantially the results of my invention may be obtained through the use of substantially the same or equivalent means.

I claim:

1. A pair of noninterchangeable threaded swivelly rotatable, substantially identical internal diameter coupling members for simultaneously transferring two different fluids between a transport equipment therefor and a storage facility therefor comprising; first male and female relatively rotatable complementary threaded coupling parts for conveying a first one of said fluids, and second male and female relatively rotatable complementary threaded coupling parts for conveying the other fluid, said first female coupling part having a complementary inner threaded portion spaced inwardly from the outer end thereof a distance at least equal to the axial length of the threaded portion thereof, and formed with an enlarged bore extending inwardly from said outer end to said threaded portion having a diameter exceeding the maximum diameter of said threaded portion, said first male coupling part having a similar complementary threaded portion extending inwardly from its outer end, terminating in an adjacent unthreaded portion not less in axial length than the axial length of the threaded portion thereof, having a diameter less than the inner diameter of the threaded portion of said first female coupling part, said female coupling part of said second coupling member being threaded internally from its outer end, terminating in an adjacent unthreaded inner portion not less in length than the axial length of the threaded portion of said male coupling part of said second male and female coupling members, said last unthreaded inner portion having a diameter exceeding the maximum diameter of the threaded portion of the male coupling part of the second coupling member, said male coupling part of said second coupling member having an outer unthreaded portion extending inwardly from its outer end for a distance at least equal to the axial length of the threaded portion of the female coupling part of the second male and female coupling members, said last unthreaded portion having a diameter less than the inner diameter of the threaded portion of said female coupling part of said second male and female coupling members, terminating in an adjacent threaded portion complemental to the threaded portion of the female coupling part of the second coupling member having an axial length not exceeding the length of the unthreaded portion thereof, whereby when the male and female coupling parts of said first and second coupling members are interchanged, the threaded portions of each can not be engaged to draw the coupling parts into fluid conveying relation.

2. A pair of noninterchangeable threaded rotary coupling members as defined in claim 1, wherein the axial length of the threads in said first and second coupling members are identical and the unthreaded portions thereof are not less in length than the axial length of the threaded portions, with the threaded portions disposed on one side of the unthreaded portions in one of the coupling members and the threaded portions disposed at the opposite side of the unthreaded portions in the other coupling member, and the threaded portions in both of the coupling members comprise one turn four start threads of identical diameter.

References Cited in the file of this patent

UNITED STATES PATENTS

| | | |
|---|---|---|
| 219,032 | Stewart | Aug. 26, 1879 |
| 1,175,834 | Stephens | Mar. 14, 1916 |
| 1,292,367 | Pettis | Jan. 21, 1919 |
| 1,842,897 | Culp | Jan. 26, 1932 |
| 2,194,973 | Durant | Mar. 26, 1940 |
| 2,394,363 | Bynoe | Feb. 5, 1946 |

FOREIGN PATENTS

| | | |
|---|---|---|
| 682,498 | Great Britain | Nov. 12, 1952 |